US011762269B2

(12) United States Patent
Chen

(10) Patent No.: US 11,762,269 B2
(45) Date of Patent: Sep. 19, 2023

(54) WAVELENGTH CONVERSION MODULE AND PROJECTION DEVICE

(71) Applicant: Coretronic Corporation, Hsin-Chu (TW)

(72) Inventor: I-Hua Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/830,319

(22) Filed: Jun. 1, 2022

(65) Prior Publication Data

US 2022/0390821 A1 Dec. 8, 2022

(30) Foreign Application Priority Data

Jun. 4, 2021 (CN) .......................... 202110622366.2

(51) Int. Cl.
*G03B 21/20* (2006.01)

(52) U.S. Cl.
CPC .................................. *G03B 21/204* (2013.01)

(58) Field of Classification Search
CPC .. G03B 21/204; G03B 21/16; G03B 21/2066; G03B 21/2033
See application file for complete search history.

(56) References Cited

U.S. PATENT DOCUMENTS

| 2018/0180975 | A1* | 6/2018 | Furuyama | C03B 19/06 |
| 2020/0019048 | A1* | 1/2020 | Jian | G03B 21/204 |
| 2020/0233291 | A1* | 7/2020 | Chen | G03B 21/204 |
| 2022/0029382 | A1* | 1/2022 | Li | H01S 5/0611 |

FOREIGN PATENT DOCUMENTS

| CN | 105278225 | A | * | 1/2016 | ........... C03C 14/006 |
| CN | 109884786 | A | * | 6/2019 | ............. G02B 26/00 |
| JP | 2016099566 | A | * | 5/2016 | |
| TW | 201515289 | | | 4/2015 | |
| TW | 202001394 | | | 1/2020 | |
| WO | WO-2019071865 | A1 | * | 4/2019 | ............... F21K 9/64 |
| WO | WO-2020119396 | A1 | * | 6/2020 | ........... G03B 21/204 |
| WO | WO-2021066054 | A1 | * | 4/2021 | |

* cited by examiner

*Primary Examiner* — Jong-Suk (James) Lee
*Assistant Examiner* — Glenn Zimmerman
(74) *Attorney, Agent, or Firm* — JCIPRNET

(57) ABSTRACT

The disclosure provides a projection device with a wavelength conversion module including a ceramic substrate, a ceramic intermediate layer, a ceramic reflection layer, and a wavelength conversion layer. The ceramic reflection layer is disposed on the ceramic intermediate layer disposed on the ceramic substrate. The thermal expansion coefficient of the ceramic intermediate layer ranges from the thermal expansion coefficient of the ceramic substrate and the thermal expansion coefficient of the ceramic reflection layer. The wavelength conversion layer is disposed on the ceramic reflection layer. With the wavelength conversion module and the projection device, separation or gaps between the ceramic substrate and the ceramic reflection layer caused by a significant difference of the thermal expansion coefficients is prevented, the adhesion between the ceramic substrate and the ceramic reflection layer is further improved, the service life and the structural reliability of the wavelength conversion module are improved.

14 Claims, 3 Drawing Sheets

WAVELENGTH CONVERSION MODULE AND PROJECTION DEVICE

CROSS-REFERENCE TO RELATED APPLICATION

This application claims the priority benefit of China application serial no. 202110622366.2, filed on Jun. 4, 2021. The entirety of the above-mentioned patent application is hereby incorporated by reference herein and made a part of this specification.

BACKGROUND

Technology Field

The disclosure relates to an optical module and a projection device, and more particularly to a wavelength conversion module and a projection device having the wavelength conversion module.

Description of Related Art

Currently, the development trend of projection devices is in pursuit of high brightness adapted for various environments. The phosphor wheel is the source of the brightness of a laser projection device. Therefore, the phosphor wheel requires characteristics of high luminous efficiency, high heat resistance, and the ability of accepting high-energy laser power.

Conventionally, in the phosphor wheel used in high laser power, phosphor powder mixed with organic glue is sintered on an inorganic material, such as ceramic or glass, to form an inorganic phosphor sheet. However, organic glue is needed to attach the inorganic phosphor sheet to the reflection layer or the heat dissipation substrate, so the phosphor wheel is still limited by the temperature resistance, transmittance, and thermal conductivity of the organic glue. For example, the visible light transmittance of the organic glue must be greater than 90%, but the thermal conductivity of the organic glue with high transmittance is less than 0.5 W/mk. Therefore, it is difficult to transmit the heat of the thermal energy generated when the phosphor sheet is excited by laser light to the heat dissipation substrate due to the poor thermal conductivity of the organic glue, and this results in high temperature of the phosphor sheet. In turn, the excitation efficiency of the phosphor sheet and the brightness of the light machine are reduced. In addition, the temperature resistance of the organic glue is limited within 300° C., and the heat accumulation generated by long-term exposure to high-power laser energy may deteriorate the glue and this gives rise to a concern of the reliability of the phosphor wheel.

Alternatively, a ceramic substrate is conventionally used to sinter the diffuse reflection layer and the phosphor sheet. However, the ceramic substrate requires a characteristic of high thermal conductivity, so the choices are limited. Currently, a common material of the ceramic heat dissipation substrate is aluminum nitride (AlN). However, when the diffuse reflection layer and the phosphor sheet are sintered on the AlN substrate, the difference between the thermal expansion coefficients of the phosphor sheet and the diffuse reflection layer and the thermal expansion coefficient of the AlN substrate is so significant that poor adhesion and cracks are prone to occur.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a wavelength conversion module capable of having favorable structural reliability.

The disclosure also provides a projection device including the wavelength conversion module, which has favorable projection quality and product competitiveness.

The other objectives and advantages of the disclosure can be further understood from the technical features disclosed in the disclosure.

In order to achieve one or part or all of the above objectives or other objectives, an embodiment of the disclosure provides a wavelength conversion module including a ceramic substrate, a ceramic intermediate layer, a ceramic reflection layer, and a wavelength conversion layer. The ceramic intermediate layer is disposed on the ceramic substrate. The ceramic reflection layer is disposed on the ceramic intermediate layer. The thermal expansion coefficient of the ceramic intermediate layer ranges from the thermal expansion coefficient of the ceramic substrate to the thermal expansion coefficient of the ceramic reflection layer. The wavelength conversion layer is disposed on the ceramic reflection layer.

In order to achieve one, part of, or all of the above objectives or other objectives, an embodiment of the disclosure provides a projection device including an illumination system, a light valve, and a projection lens. The illumination system is adapted to provide an illumination beam, and the illumination system includes a light source module and a wavelength conversion module. The light source module is adapted to provide an excitation beam. The wavelength conversion module is disposed on a transmission path of the excitation beam to convert the excitation beam into the illumination beam. The wavelength conversion module includes a ceramic substrate, a ceramic intermediate layer, a ceramic reflection layer, and a wavelength conversion layer. The ceramic intermediate layer is disposed on the ceramic substrate. The ceramic reflection layer is disposed on the ceramic intermediate layer. The thermal expansion coefficient of the ceramic intermediate layer ranges from the thermal expansion coefficient of the ceramic substrate and the thermal expansion coefficient of the ceramic reflection layer. The wavelength conversion layer is disposed on the ceramic reflection layer to receive the excitation beam. The light valve is disposed on a transmission path of the illumination beam to convert the illumination beam into an image beam. The projection lens is disposed on a transmission path of the image beam to project the image beam from the projection device.

Based on the above, the embodiments of the disclosure have at least one of the following advantages or effects. In the design of the wavelength conversion module of the disclosure, the ceramic intermediate layer is disposed between the ceramic substrate and the ceramic reflection layer, and the thermal expansion coefficient of the ceramic intermediate layer ranges from the thermal expansion coefficient of the ceramic substrate to the thermal expansion coefficient of the ceramic reflection layer. Accordingly, with the ceramic intermediate layer, the separation or the gaps between the ceramic substrate and the ceramic reflection layer caused by a significant difference of the thermal expansion coefficients can be prevented. Furthermore, the adhesion between the ceramic substrate and the ceramic reflection layer can be improved, the service life of the wavelength conversion module is prolonged, and the structural reliability of the wavelength conversion module is improved. Moreover, the projection device adopting the wavelength conversion module of the disclosure can have favorable projection quality and product competitiveness.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is adapted for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A "Component is directly "adjacent to" "B" component or one or more additional components are between "A" component and "B" component. Accordingly, the drawings and descriptions will be regarded as illustrative in nature and not as restrictive.

Figure 1:
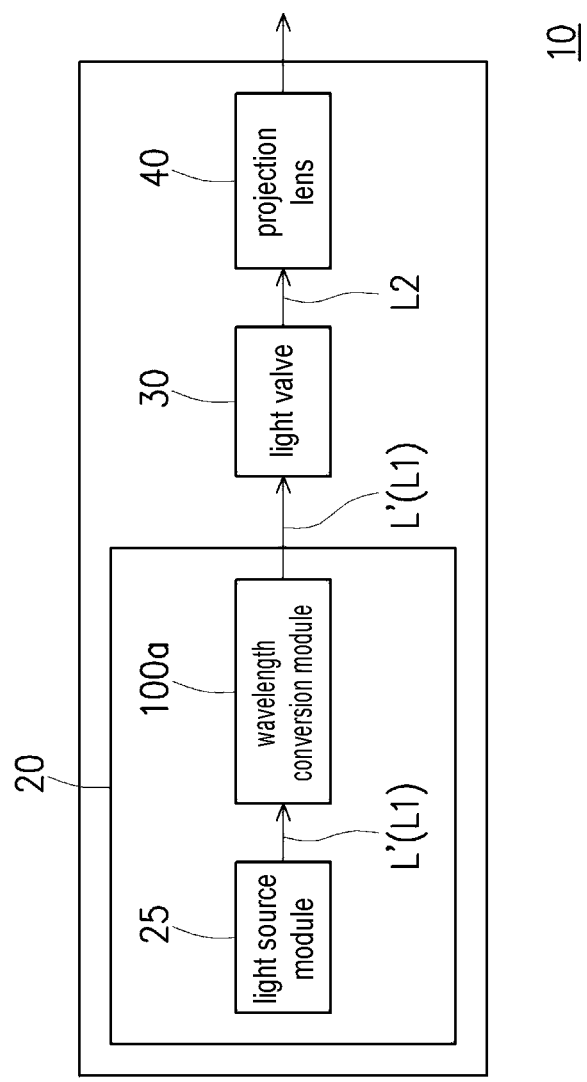
FIG. 1 is a schematic view of a projection device according to an embodiment of the disclosure.

FIG. 1 is a schematic view of a projection device according to an embodiment of the disclosure. Referring to FIG. 1, in the embodiment, a projection device 10 includes an illumination system 20, a light valve 30, and a projection lens 40. The illumination system 20 is adapted to provide an illumination beam L1. The illumination system 20 includes a light source module 25 and a wavelength conversion module 100a. The light source module 25 is adapted to provide an excitation beam L'. The wavelength conversion module 100a is disposed on the transmission path of the excitation beam L' and adapted for converting the excitation beam L' into a converted beam. Meanwhile, the illumination beam L1 includes at least one of the excitation beam L' and the converted beam. The light valve 30 is disposed on the transmission path of the illumination beam L1 to convert the illumination beam L1 into an image beam L2. The projection lens 40 is disposed on the transmission path of the image beam L2 for projecting the image beam L2 from the projection device 10. For example, the wavelength conversion module 100a is a phosphor wheel to repeatedly enter the transmission path of the excitation beam L'.

Specifically, the light source module 25 used in the embodiment is a laser diode (LD), such as a laser diode bank, for example. Specifically, any light source that meets the volume requirement according to an actual design can be implemented, and the disclosure is not limited thereto. For example, the light valve 30 is a reflective light modulator, such as a liquid crystal on silicon panel (LCoS panel), a digital micro-mirror device (DMD), and the like. In an embodiment, for example, the light valve 30 is a transmissive optical modulator, such as a transparent liquid crystal panel, an electro-optical modulator, a magneto-optic modulator, an acousto-optic modulator (AOM). However, in the embodiment, the mode and the type of the light valve 30 is not limited there to. The detailed steps and implementation of the method for the light valve 30 to convert the illumination beam L1 into the image beam L2 can be obtained from the common knowledge in the field with sufficient teaching, suggestion, and implementation description, which are not iterated herein. Moreover, for example, the projection lens 40 includes a combination of one or more optical lenses having refractive power, such as various combinations of non-planar lenses—e.g., biconcave lenses, biconvex lenses, meniscus lenses, convex-concave lenses, plano-convex lenses, and plano-concave lenses. In an embodiment, the projection lens 40 may also include a plane optical lens to convert the image beam L2 from the light valve 30 into a projection beam which is projected from the projection device 10 in a reflection or penetration manner. In the embodiment, the mode and the type of the projection lens 40 is not limited thereto.

Figure 2:
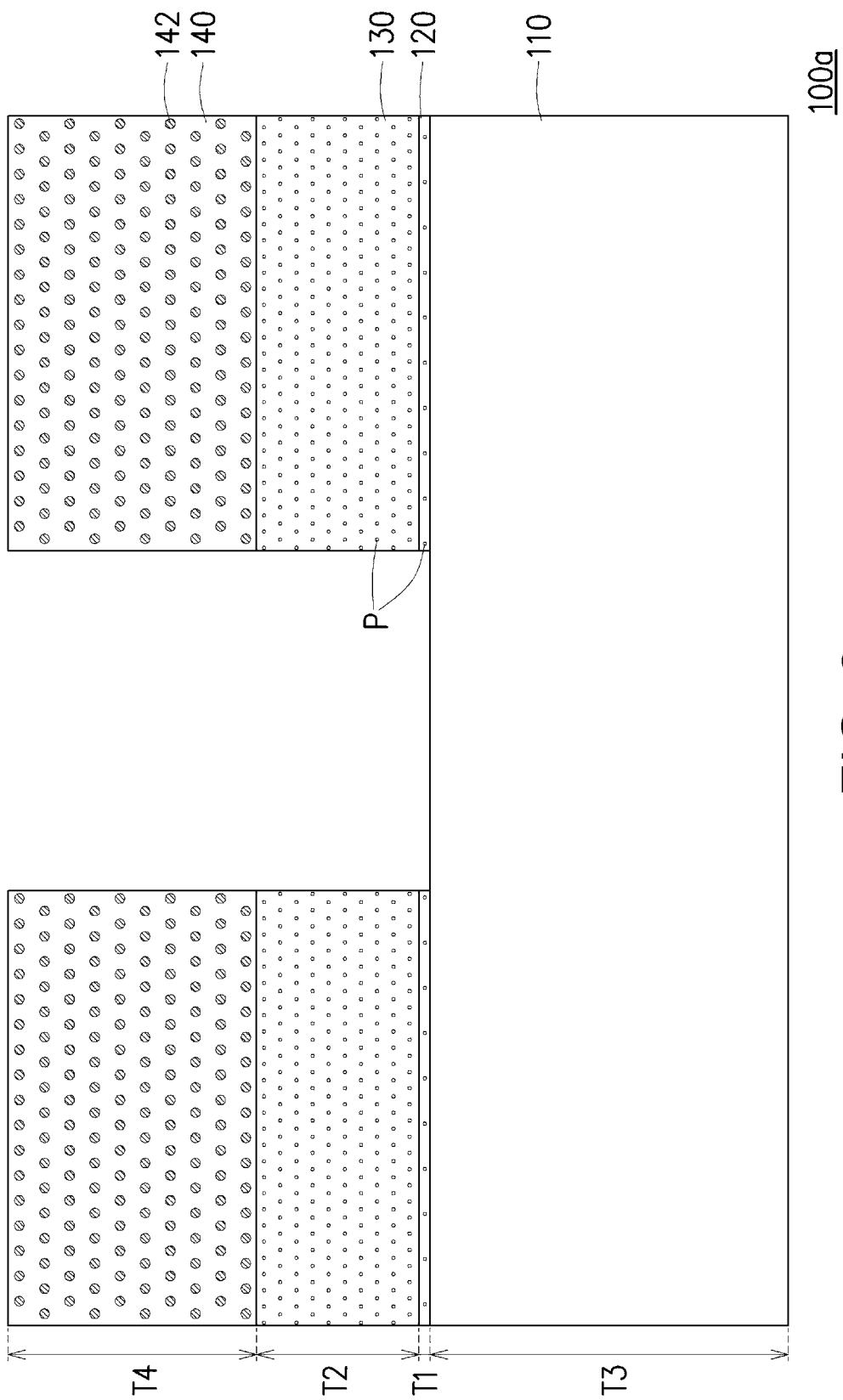
FIG. 2 is a schematic cross-sectional view of a wavelength conversion module of the projection device of FIG. 1.

FIG. 2 is a schematic cross-sectional view of a wavelength conversion module of the projection device of FIG. 1. Referring to FIG. 2, in the embodiment, the wavelength conversion module 100a includes a ceramic substrate 110, a ceramic intermediate layer 120, a ceramic reflection layer 130, and a wavelength conversion layer 140. The ceramic intermediate layer 120 is disposed on the ceramic substrate 110. The ceramic reflection layer 130 is disposed on the ceramic intermediate layer 120. The thermal expansion coefficient of the ceramic intermediate layer 120 ranges between the thermal expansion coefficient of the ceramic substrate 110 and the thermal expansion coefficient of the ceramic reflection layer 130. In the embodiment, for example, the thermal expansion coefficient of the ceramic substrate 110 is $4 \times 10^{-6}$/° C.; for example, the thermal expansion coefficient of the ceramic intermediate layer 120 is $5.5 \times 10^{-6}$/° C.; and for example, the thermal expansion coefficient of the ceramic reflection layer 130 is $7 \times 10^{-6}$/° C. The wavelength conversion layer 140 is disposed on the ceramic reflection layer 130.

With the above design, the ceramic intermediate layer 120 can prevent separation or gaps between the ceramic substrate 110 and the ceramic reflection layer 130 caused by a significant difference of the thermal expansion coefficients. Furthermore, the ceramic intermediate layer 120 can adjust the sintering matching of the ceramic substrate 110 and the ceramic reflection layer 130 to increase the adhesion between the ceramic substrate 110 and the ceramic reflection layer 130. Moreover, the ceramic intermediate layer 120 can protect the ceramic substrate 110 and prevent the ceramic substrate 110 from hydrolyzing in a high-temperature and high-humidity environment, and the adhesive on the ceramic substrate 110 is further prevented from falling off. Therefore, the wavelength conversion module 100a of the embodiment has a relatively long service life and relatively high reliability.

Furthermore, in the embodiment, the material of the ceramic substrate 110 is aluminum nitride, for example. The materials of the ceramic intermediate layer 120 and the ceramic reflection layer 130 are ceramic or glass, for example. The material of the ceramic is silicon oxide or aluminum oxide, for example; and the material of the glass is silicon oxide with an amorphous structure, for example. However, the disclosure is not limited thereto. The ceramic intermediate layer 120 and the ceramic reflection layer 130 can be formed by a mixture of at least two ceramic materials with different physical properties, such as silica mixed with alumina. Alternatively, the ceramic intermediate layer 120 and the ceramic reflection layer 130 can also be formed by a mixture of silicon oxides with different crystal structures. In the embodiment, the stack structure of the wavelength conversion module 100a is made of inorganic materials. Therefore, the wavelength conversion module 100a in the embodiment has temperature resistance, thermal conductivity, light efficiency, and reliability.

Furthermore, the ceramic intermediate layer 120 and the ceramic reflection layer 130 respectively include multiple ceramic particles P. For example, the ceramic particles P are ceramic powder, and the material of the ceramic particles P is silicon oxide, aluminum oxide, zirconium oxide, or boron nitride, for example. The particle size of each of the ceramic particles P ranges from 0.1 μm to 5 μm, for example. In the embodiment, the volume ratio of the ceramic particles P in the ceramic intermediate layer 120 to the ceramic intermediate layer 120 is less than the ratio of the ceramic particles P in the ceramic reflection layer 130 to the volume of the ceramic reflection layer 130. Specifically, the volume ratio of the ceramic particles P in the ceramic intermediate layer 120 to the ceramic intermediate layer 120 ranges from 0% to 20%, for example. The volume ratio of the ceramic particles P in the ceramic reflection layer 130 to the ceramic reflection layer 130 ranges from 40% to 70%, for example. In the embodiment, the reflectance of the ceramic intermediate layer 120 over the visible light waveband is less than the reflectance of the ceramic reflection layer 130 over the visible light waveband.

As shown in FIG. 2, in the embodiment, a first thickness T1 of the ceramic intermediate layer 120 is less than a second thickness T2 of the ceramic reflection layer 130. Specifically, the first thickness T1 of the ceramic intermediate layer 120 ranges from 0.1 μm to 50 μm, for example, and the second thickness T2 of the ceramic reflection layer 130 ranges from 0.08 mm to 0.2 mm, for example. In the embodiment, a thickness T3 of the ceramic substrate 110 ranges from 0.3 mm to 1 mm, for example, and a thickness T4 of the wavelength conversion layer 140 ranges from 0.08 mm to 0.25 mm, for example.

In the embodiment, the wavelength conversion layer 140 includes multiple phosphor particles 142, and the material of the phosphor particles 142 is yttrium aluminum garnet, for example. The particle size of each of the phosphor particles ranges from 10 μm to 35 μm, for example. Specifically, in the wavelength conversion layer 140, the volume ratio of the phosphor particles to the wavelength conversion layer 140 ranges from 40% to 70%, for example.

In terms of processing, in the embodiment, the wavelength conversion module 100a can be processed by sequentially sintering the ceramic intermediate layer 120, the ceramic reflection layer 130, and the wavelength conversion layer 140 on the ceramic substrate 110. Specifically, a low concentration of the ceramic powder P mixed with inorganic materials is first coated on the ceramic substrate 110, and then the ceramic intermediate layer 120 is formed after a sintering at a high temperature. Meanwhile, the low concentration of the ceramic powder P refers to the low volume concentration of the ceramic powder P relative to the volume concentration of the ceramic powder P of the ceramic reflection layer 130. Next, the ceramic powder P with high reflectance mixed with inorganic materials is coated on the surface of the ceramic intermediate layer 120, and the ceramic reflection layer 130 is formed after a sintering at a high temperature. Meanwhile, the high reflectance refers to the reflectance over the visible light waveband greater than 90%, and the material of the ceramic powder P with high reflectance is titanium oxide, aluminum oxide, zinc oxide, and silicon oxide, for example. Finally, the inorganic material mixed with wavelength conversion material is coated on the surface of the ceramic reflection layer 130, and the wavelength conversion layer 140 is formed after a sintering at a high temperature. The material of the wavelength conversion material is yttrium aluminum garnet, for example.

In the embodiment, the inorganic material is ceramics, for example. However, in other embodiments, the inorganic material may also be glass. Since inorganic materials such as ceramics or glass have high heat resistance, their sintering temperature can be greater than 500 degrees. Moreover, in the embodiment, the sintering temperature of the ceramic intermediate layer 120 is greater than or equal to the sintering temperature of the ceramic reflection layer 130, and the sintering temperature of the ceramic reflection layer 130 is greater than or equal to the sintering temperature of the wavelength conversion layer 140.

In short, in the embodiment, with the ceramic intermediate layer 120, the wavelength conversion module 100a is capable of preventing the separation or the gaps between the ceramic substrate 110 and the ceramic reflection layer 130 caused by a significant difference of the thermal expansion coefficients. Therefore, the adhesion between the ceramic substrate 110 and the ceramic reflection layer 130 can be improved, the service life of the wavelength conversion module 100a is prolonged, and the structural reliability of the wavelength conversion module 100a is improved. Moreover, the projection device 10 adopting the wavelength conversion module 100a of the embodiment can have favorable projection quality and product competitiveness.

It should be noted here that the following embodiments adopt the reference numbers and partial contents of the foregoing embodiments, wherein the same reference numbers are used to indicate the same or similar elements, and the description of the same technical content is omitted. For the description of the omitted parts, reference may be made to the foregoing embodiments, and the same content will not be iterated in the following embodiments.

Figure 3:
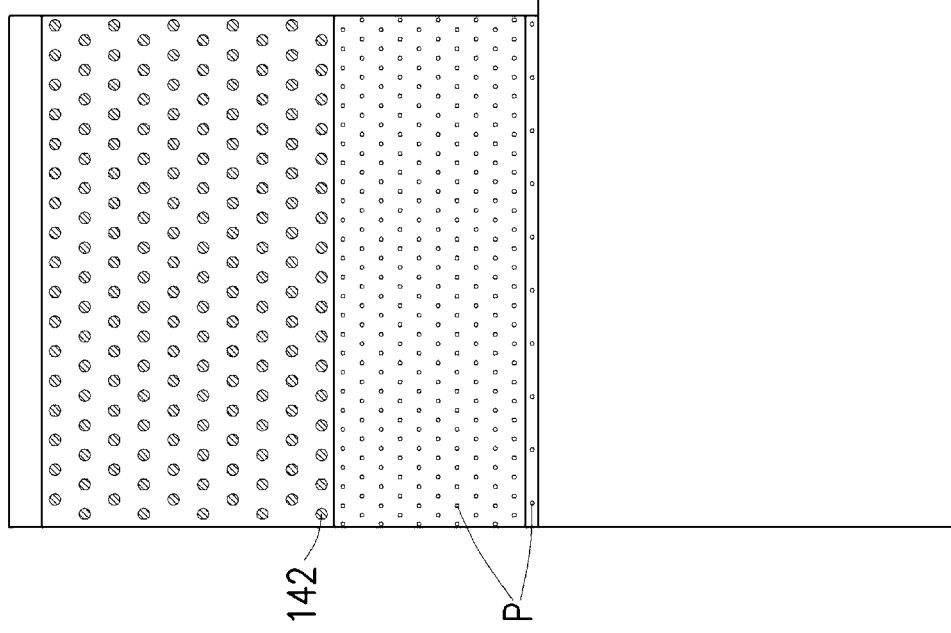
FIG. 3 is a schematic cross-sectional view of a wavelength conversion module according to another embodiment of the disclosure.

FIG. 3 is a schematic cross-sectional view of a wavelength conversion module according to another embodiment of the disclosure. Referring to both FIG. 2 and FIG. 3, a wavelength conversion module 100b in the embodiment is similar to the wavelength conversion module 100a of FIG. 2. The difference between the two is that the wavelength conversion module 100b in the embodiment further includes an anti-reflection film 150, and the anti-reflection film 150 is made of nano-grade silicon oxide and titanium oxide, for example. The anti-reflection film 150 is disposed on the wavelength conversion layer 140, and the wavelength conversion layer 140 is located between the anti-reflection film 150 and the ceramic reflection layer 130.

Based on the above, the embodiments of the disclosure have at least one of the following advantages or effects. In the design of the wavelength conversion module of the disclosure, the ceramic intermediate layer is disposed between the ceramic substrate and the ceramic reflection layer, and the thermal expansion coefficient of the ceramic intermediate layer ranges from the thermal expansion coefficient of the ceramic substrate to the thermal expansion coefficient of the ceramic reflection layer. Accordingly, with the ceramic intermediate layer, the separation or the gaps between the ceramic substrate and the ceramic reflection layer caused by a significant difference of the thermal expansion coefficients can be prevented. Furthermore, the adhesion between the ceramic substrate and the ceramic reflection layer can be improved, the service life of the wavelength conversion module is prolonged, and the structural reliability of the wavelength conversion module is improved. Moreover, the projection device adopting the wavelength conversion module of the disclosure can have favorable projection quality and product competitiveness.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module, wherein the wavelength conversion module comprises:
a ceramic substrate;
a ceramic intermediate layer disposed on the ceramic substrate;
a ceramic reflection layer disposed on the ceramic intermediate layer, wherein a thermal expansion coefficient of the ceramic intermediate layer ranges from a thermal expansion coefficient of the ceramic substrate to a thermal expansion coefficient of the ceramic reflection layer,
wherein the thermal expansion coefficient of the ceramic intermediate layer is different from the thermal expansion coefficient of the ceramic substrate, the thermal expansion coefficient of the ceramic intermediate layer is different from the thermal expansion coefficient of the ceramic reflection layer, and the thermal expansion coefficient of the ceramic substrate is different from the thermal expansion coefficient of the ceramic reflection layer; and
a wavelength conversion layer disposed on the ceramic reflection layer, the ceramic intermediate layer and the ceramic reflection layer respectively comprise a plurality of ceramic particles,
wherein a volume ratio of the plurality of the ceramic particles in the ceramic intermediate layer to the ceramic intermediate layer is less than a volume ratio of the plurality of the ceramic particles in the ceramic reflection layer to the ceramic reflection layer.

2. The wavelength conversion module of claim 1, wherein a particle size of each of the plurality of the ceramic particles ranges from 0.1 µm to 5 µm.

3. The wavelength conversion module of claim 1, wherein the volume ratio of the plurality of the ceramic particles in the ceramic intermediate layer to the ceramic intermediate layer ranges from greater than 0% to 20%.

4. The wavelength conversion module of claim 1, wherein the volume ratio of the plurality of the ceramic particles in the ceramic reflection layer to the ceramic reflection layer ranges from 40% to 70%.

5. The wavelength conversion module of claim 1, wherein a first thickness of the ceramic intermediate layer is less than a second thickness of the ceramic reflection layer.

6. The wavelength conversion module of claim 5, wherein the first thickness of the ceramic intermediate layer ranges from 0.1 µm to 50 µm.

7. The wavelength conversion module of claim 5, wherein the second thickness of the ceramic reflection layer ranges from 0.08 mm to 0.2 mm.

8. The wavelength conversion module of claim 1, wherein a reflectance of the ceramic intermediate layer over a visible light waveband is less than a reflectance of the ceramic reflection layer over a visible light waveband.

9. The wavelength conversion module of claim 1, wherein a thickness of the ceramic substrate ranges from 0.3 mm and 1 mm.

10. The wavelength conversion module of claim 1, wherein the wavelength conversion layer comprises a plurality of phosphor particles, and a particle size of each of the plurality of the phosphor particles ranges from 10 μm to 35 μm.

11. The wavelength conversion module of claim 10, wherein in the wavelength conversion layer, a volume ratio of the plurality of the phosphor particles to the wavelength conversion layer ranges from 40% to 70%.

12. The wavelength conversion module of claim 1, wherein a thickness of the wavelength conversion layer ranges from 0.08 mm to 0.25 mm.

13. The wavelength conversion module of claim 1, wherein the wavelength conversion module further comprises:
an anti-reflection film disposed on the wavelength conversion layer, wherein the wavelength conversion layer is located between the anti-reflection film and the ceramic reflection layer.

14. A projection device, wherein the projection device comprises:
an illumination system for providing an illumination beam, wherein the illumination system comprises:
a light source module adapted to provide an excitation beam; and
a wavelength conversion module disposed on a transmission path of the excitation beam to convert the excitation beam into the illumination beam, wherein the wavelength conversion module comprises:
a ceramic substrate;
a ceramic intermediate layer disposed on the ceramic substrate;
a ceramic reflection layer disposed on the ceramic intermediate layer, wherein a thermal expansion coefficient of the ceramic intermediate layer ranges from a thermal expansion coefficient of the ceramic substrate and a thermal expansion coefficient of the ceramic reflection layer,
wherein the thermal expansion coefficient of the ceramic intermediate layer is different from the thermal expansion coefficient of the ceramic substrate, the thermal expansion coefficient of the ceramic intermediate layer is different from the thermal expansion coefficient of the ceramic reflection layer, and the thermal expansion coefficient of the ceramic substrate is different from the thermal expansion coefficient of the ceramic reflection layer;
a wavelength conversion layer disposed on the ceramic reflection layer for receiving the excitation beam, the ceramic intermediate layer and the ceramic reflection layer respectively comprise a plurality of ceramic particles,
wherein a volume ratio of the plurality of the ceramic particles in the ceramic intermediate layer to the ceramic intermediate layer is less than a volume ratio of the plurality of the ceramic particles in the ceramic reflection layer to the ceramic reflection layer;
a light valve disposed on a transmission path of the illumination beam to convert the illumination beam into an image beam; and
a projection lens disposed on a transmission path of the image beam for projecting the image beam from the projection device.

* * * * *